United States Patent [19]

Lagache

[11] Patent Number: 5,152,315
[45] Date of Patent: Oct. 6, 1992

[54] OVERFILL DEVICE FOR A LIQUID STORAGE TANK

[75] Inventor: Roland Lagache, Lége, France

[73] Assignee: Lafon Production S.A., France

[21] Appl. No.: 626,568

[22] Filed: Dec. 12, 1990

[30] Foreign Application Priority Data

Dec. 15, 1989 [FR] France .................. 89 16604

[51] Int. Cl.⁵ ........................................ F16K 31/18
[52] U.S. Cl. .................... 137/448; 137/434; 141/198
[58] Field of Search .............. 141/198, 205, 213; 137/410, 411, 416, 434, 445, 448, 513.3, 630, 630.15, 875; 251/298

[56] References Cited

U.S. PATENT DOCUMENTS

| | | | |
|---|---|---|---|
| 1,246,033 | 11/1917 | Adams | 137/448 X |
| 2,796,082 | 6/1957 | Green et al. | 137/630.15 |
| 3,078,867 | 2/1963 | McGillis et al. | 137/416 |
| 3,279,491 | 10/1966 | Brady | 137/448 |
| 3,595,272 | 7/1971 | Conklin | 137/875 |
| 4,308,894 | 1/1982 | Carpentier | 222/450 X |
| 4,667,711 | 5/1987 | Draft | 141/198 |
| 4,986,320 | 1/1991 | Kesterman et al. | 141/198 |
| 4,998,571 | 3/1991 | Blue et al. | 137/434 X |

FOREIGN PATENT DOCUMENTS 2331732  6/1977  France .

Primary Examiner—Martin P. Schwadron
Assistant Examiner—Kevin L. Lee
Attorney, Agent, or Firm—Jenner & Block

[57] ABSTRACT

The overfill device comprises a body (6), a flap valve (7) mounted in the body, a float (8) connected by a lever (9) to the valve, a plunger tube (10) connected to the body (6) and provided with an aperture (11), characterized in that an elastically deformable closure member (13) is mounted in the plunger tube and is applicable against the inner surface parts of the tube located on each side of the aperture by the effect of its own resilience and thereby closes the aperture when the float is located outside the plunger tube. Applications in tanks storing liquid products such as hydrocarbons.

14 Claims, 4 Drawing Sheets

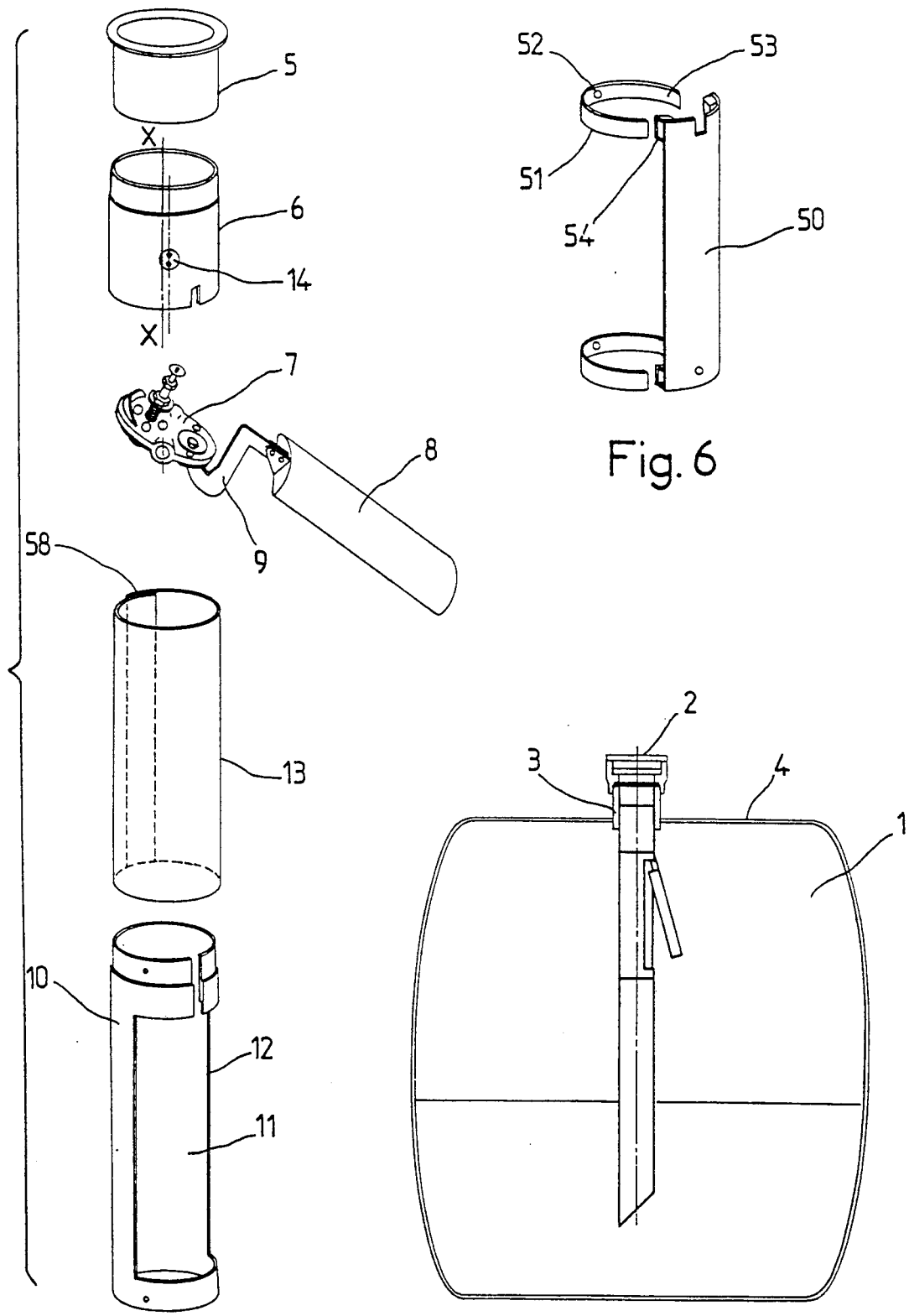

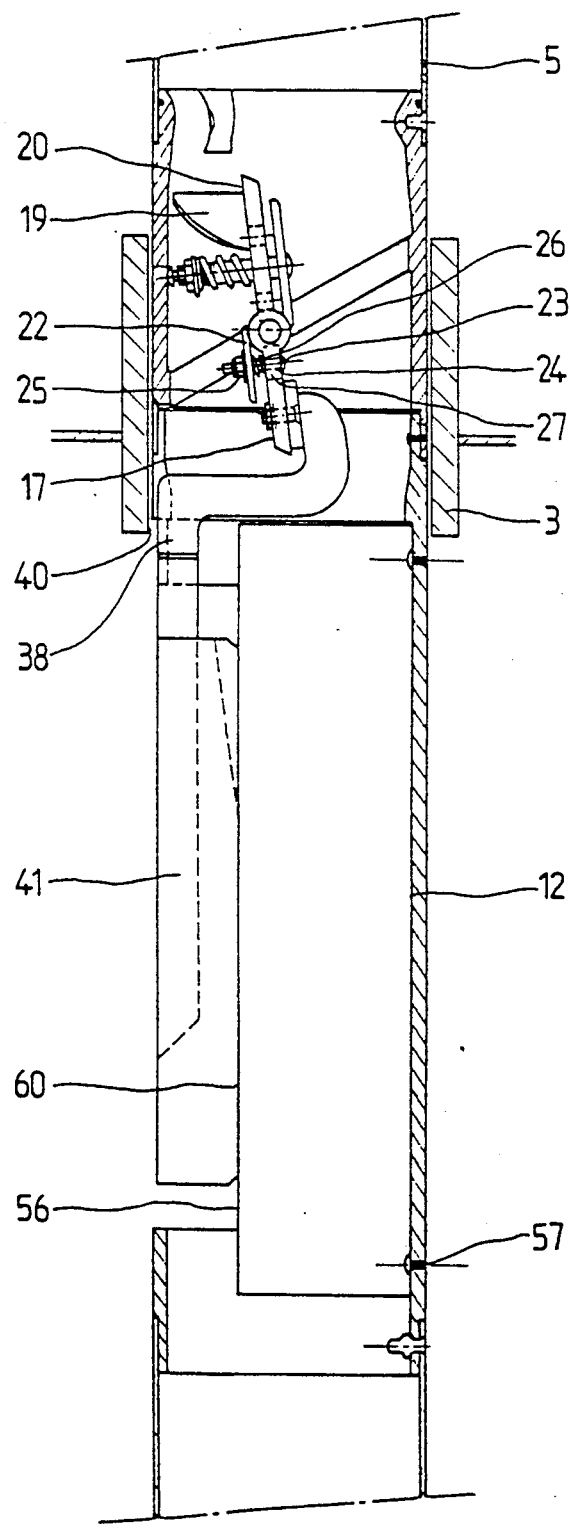

OVERFILL DEVICE FOR A LIQUID STORAGE TANK

The present invention relates to an overfill device for a liquid storage tank.

It is known to equip an underground or overhead storage tank for receiving a liquid with an overfill device whose function is to stop the filling of the tank when the liquid in the tank reaches a predetermined level so as to avoid overflowing which might be harmful to the environment of the tank. This is above all desired when the tank to be filled is located at a service station supplying hydrocarbons of various types.

Overfill devices which are the simplest in construction comprise a body, a flap valve mounted in said body and movable between an opening position corresponding to the filling of the tank and a closing position corresponding to the stopping of the filling of the tank, a float connected to said flap valve detects the rise of liquid in the tank so as to close the flap valve when a predetermined liquid level is reached in the tank.

Such an overfill device is disclosed for example in the Adams U.S. Pat. No. 1,246,033.

Other improved overfill devices have been proposed in recent years, as for example those disclosed in French Patent No. 2,331,732 and U.S. Pat. No. 4,667,711. The overfill devices disclosed in these patents permit passing them through orifices or receiving tubes provided in or connected to the upper wall of the tank. Indeed, it became necessary to design overfill devices whose floats were capable of being inserted in a plunger tube which extends the body and is disposed inside the tank. To this end, the plunger tubes were provided with an aperture which was closed by a trapdoor when the overfill device was in its operating position in the storage tank, the float then being outside said plunger tube. Positioning the float inside the plunger tube permits reducing the overall size of the overfill device and consequently passing it through orifices of small diameter.

However, a specific control for the trapdoor was necessary for opening and closing the aperture.

In French Patent No. 2 331 732, the trapdoor control is formed by a rod provided with a hook whereby the trapdoor is made to slide from the aperture opening position to the aperture closing position. When the trapdoor is in the closing position, the hook and the rod are disengaged from the trapdoor and withdrawn from the overfill device.

In U.S. Pat. No. 4,667,711, the trapdoor is controlled by means of a flexible tongue or tab which is pulled upon in order to bring the trapdoor to the closing position.

In the two overfill devices of the prior art briefly described hereinbefore, it is difficult if not impossible to open the trapdoor and permit a new positioning of the float inside the plunger tube.

In European Patent Application No. EP-A-0 312 320, an overfill device is described whose plunger tube has throughout its length a circular cross-section except for a zone which corresponds to a recess in the plunger tube. The recess must be deep enough to receive the whole of the float when introducing the overfill device in the passage orifice of the storage tank.

However, the solution suggested in the aforementioned European Patent Application has a major drawback which resides in the narrowing of the section of the passage for the liquid in the plunger tube in the zone in which the outer recess is provided, because an inner boss corresponds to the outer recess and constitutes an obstacle to the liquid flowing in the plunger tube.

An object of the present invention is to overcome the aforementioned drawbacks and to provide an overfill device for a storage tank which is of very simple construction, comprises a minimum number of parts and is reliable in operation.

According to a principal aspect of the present invention, the overfill device is of the type comprising a body which is extended by a plunger tube, a flap valve mounted in said body and movable between an opening position and a closing position, a flap valve seat provided in said body against which said flap valve comes to bear in the closing position, an aperture provided in the wall of the plunger tube, a float connected to said flap valve and capable of being at least partly introduced in said plunger tube through said aperture, said float bringing said flap valve from the opening position to the closing position at a predetermined level of the liquid in said storage tank, and is characterized in that an elastically deformable closure member is mounted in the plunger tube and is capable, owing to its resilience, of being applied against parts of the inner wall surface of the plunger tube located on each side of said aperture, and thereby closing said aperture when the float is located outside the plunger tube.

An advantage of the present invention resides in the fact that the section of the passage for the fluid in the overflow device is not reduced and the overflow device can be introduced in the storage tank through a relatively small orifice owing to the fact that the float can be introduced inside the plunger tube.

According to another feature of the present invention, the float is of elongated shape and has a cross-section which is substantially in the shape of a circular sector, the inner side being in major part planar with at least one concave part, and said float is connected to said flap valve by a "chair"-shaped lever whose intermediate part is inclined and makes an angle of more than 90° with the lower part which is also inclined and in alignment with the upper generatrix of the float.

This enables the float to be introduced in the plunger tube when the overfill device is withdrawn from the storage tank. Indeed, the inclination of the lower part of the connection lever between the flap valve and the float permits, by a sliding contact with a fixed passage tube provided in the storage tank, pivoting the float toward the interior of the plunger tube.

Further advantages and features will be apparent from the following description of two embodiments of the overflow device according to the present invention with reference to the accompanying drawings, in which:

FIG. 1 is a diagrammatic view of a storage tank equipped with an overfill device according to the present invention;

FIG. 2 is an exploded perspective view of the overfill device in a first embodiment of the invention;

FIGS. 3 to 5 are sectional views of the overfill device shown in FIG. 1 in respect of different positions of the flap valve and float;

FIG. 6 is an exploded perspective view of another embodiment of the closure member for the aperture of the plunger tube.

Figure 4:
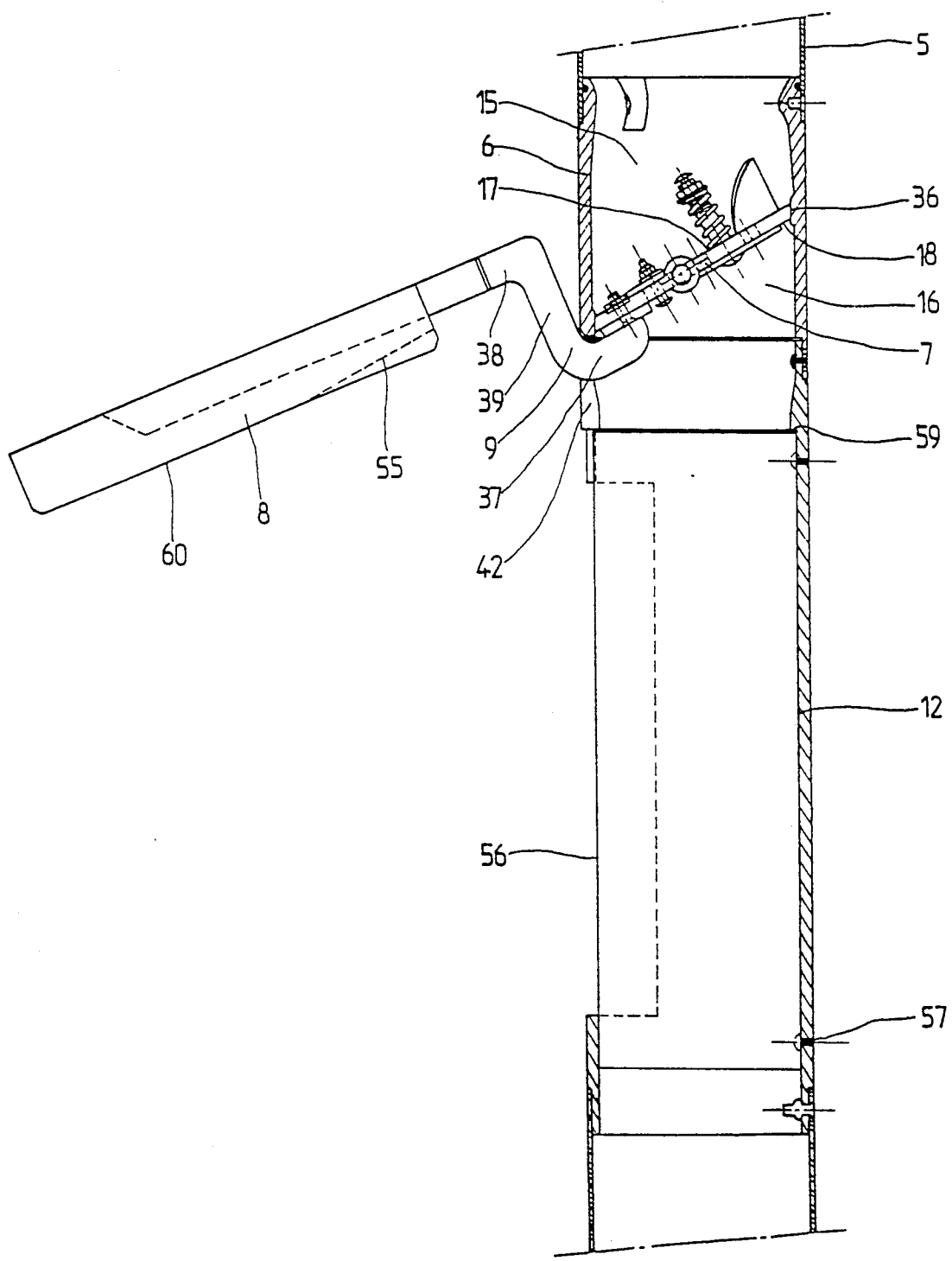
Figure 5:
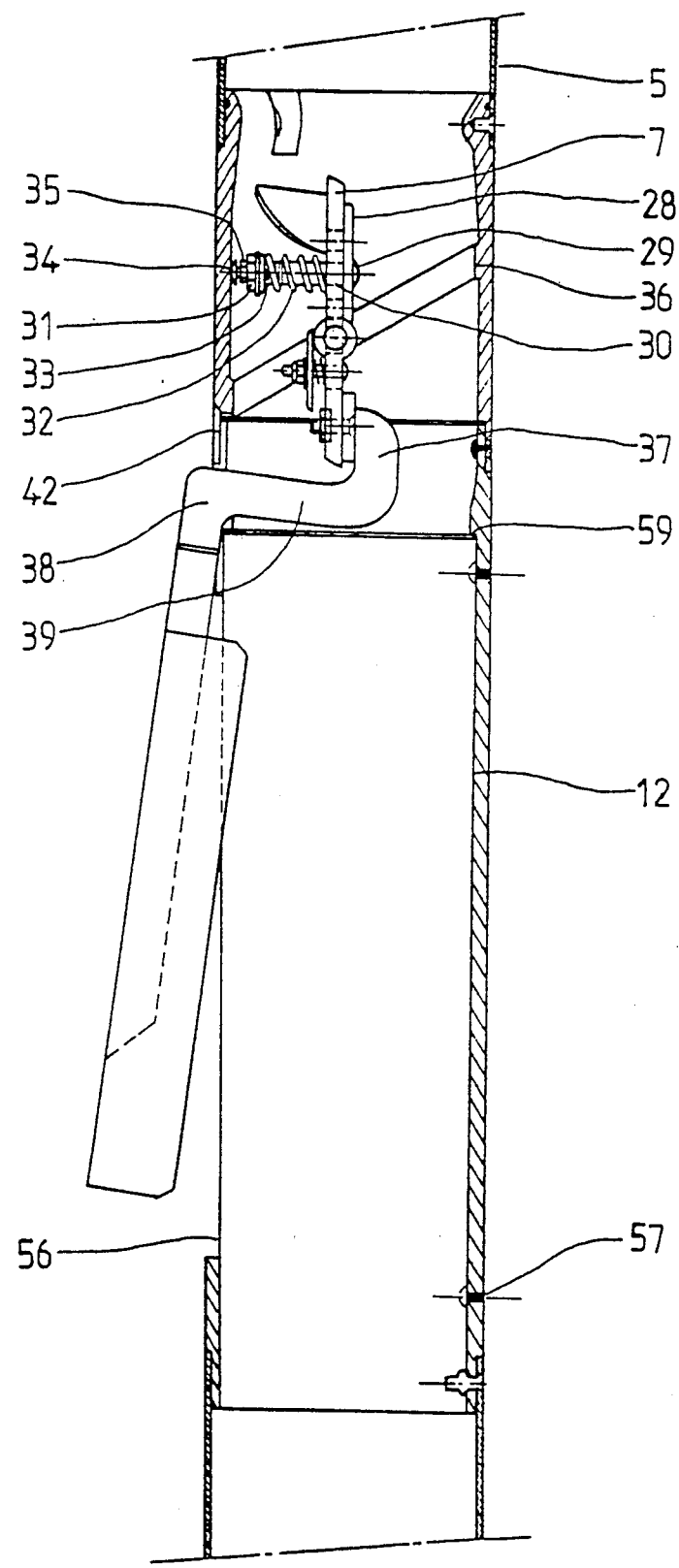

The overfill device according to the present invention is adapted to equip a storage tank 1 of a fluid such as a hydrocarbon, the tank being provided with a passage orifice defined by the internal section of a passage tube 3 connected to the upper wall 4 of the tank 1 shown in FIG. 1. The overfill device is fixed, after it has been inserted in the storage tank 1, to the passage tube 3 by any suitable means such as a support 5 which is connected to said overfill device.

The overfill device shown in FIG. 2 mainly comprises a cylindrical body 6 having a vertical axis X—X in which is mounted a flap valve 7 movable between an opening position and a closing position, a float 8 connected to the valve 7 by a rigid lever 9, a cylindrical plunger tube 10 provided with an aperture 11 in a wall part 12 of the tube, and a closure member 13, i.e., a means for closing the aperture 11.

The valve 7 is more specifically of the butterfly type and pivots about a pin 14 which is eccentric relative to the vertical axis X—X of the cylindrical body 6. The valve 7, in the closing position on a seat 36 disposed at substantially 45° to the axis X—X inside said body as shown in FIG. 4, defines within the cylindrical body 6 an upstream chamber 15 and a downstream chamber 16. The side of the valve 7 adjacent to the upstream chamber 15 is the upstream side 17 while the other side of the valve is the downstream side 18.

A curved wall portion 19 is fixed to the upstream side 17 of the valve 7 in a perpendicular position relative to the side 17 and serves to ensure that the pressure of the liquid admitted into the cylindrical body 6 when the storage tank is being filled does not cause the sudden closure of the valve 7 due to the high pressures which would be exerted on the upstream side 17 of the valve 7. Preferably, the wall portion 19 which has a shape substantially similar to a cap visor, is located close to the end edge 20 of the valve 7 and has a height which is less than the distance between the upstream side 17 of the valve and the inner surface of the body when the float 8 is disposed inside the plunger tube 10.

An emptying accelerating valve 22 is provided on the upstream side 17 of the valve 7 and is connected to a rod 23 extending through an orifice 24. A nut 25 for adjusting the stiffness or calibration of a spring 26 is mounted on the rod 23. Consequently, as long as the liquid pressure prevailing in the upstream chamber 15 is higher than the effect of the spring 26, the valve 22 remains applied against the valve side 17 and prevents any communication between the upstream and downstream chambers 15 and 16 through ports 27. On the other hand, as soon as the difference between the pressures in said chambers is less than a predetermined value corresponding to the stiffness of the spring 26, the valve 22 opens and the liquid contained in the upstream chamber 15 flows through the ports 27 into the downstream chamber 16 and thence into the storage tank.

A shock-wave damping poppet valve 28 is provided on the downstream side 18 of the valve 7. The damping valve is mounted on the end of a hollow rod 29 extending through an orifice 30 provided in the valve 7. A nut 31 adjusting the stiffness or calibration of a spring 32 is screwed on an outer screw-threaded portion 33 of the rod 29. An abutment 34 formed by a screw-threaded rod provided with a slightly enlarged head is screwed in a tapped portion of the rod 29. The abutment 34 is locked in position by a lock nut 35. When the valve 7 is suddenly closed onto its seat 36, a shock-wave is created in the upstream chamber 15 which is propagated in a filling pipe or hose connecting the overfill device to a supply tank truck or other source of liquid. In the absence of the damping valve 28, the propagation of the shock-wave between the valve 7 and the control gate valve of the tank truck would cause successive openings and closings of the valve 7 relative to its seat. The damping valve 28 opens as soon as the shock-wave is created upon the sudden closure of the valve 7; consequently, a drop in the overpressure is produced and the shock-wave is very rapidly reduced in amplitude and the valve 7 no longer tends to open. It is therefore found that the damping valve 28 opens only when the difference between the pressures prevailing in the upstream and downstream chambers is higher than a predetermined value governed by the stiffness of the spring 32.

The float 8, of suitable material, is of elongated shape and includes an inner side which is in major part planar except for a concave part 55. The section of the float in respect of the planar part of the inner side has the shape of a circular sector.

The float 8 is connected to the valve 7 by a rigid lever 9 in the shape of a "chair". The upper part 37 of the lever is connected to the valve 7 while the lower part 38 is connected to the float. The intermediate part 39 is inclined to the horizontal so as to make an angle of less than 90° with the upper part 37. The lower part 38 is inclined to the vertical so as to make an angle which is equal to or greater than 90° with the intermediate part and it is in alignment with the upper generatrix of the float so that, when the overfill device is withdrawn from the storage tank, the sliding contact of the lower part 38 of the lever 9 with the lower edge 40 of the passage tube 3 causes a tilting of the lever and consequently a displacement of the float toward the plunger tube and permits an extraction of said overfill device which is as easy as its introduction in said passage tube. Preferably, the lever 9 is extended by two strips 41 which are embedded in the mass of the float 8 so as to render the latter more rigid.

The lever 9 is able to pivot relative to the body 6 owing to the provision of a notch 42 formed in the lower part of the body 6, this notch 42 being in alignment with a notch 43 also provided in the upper part of the plunger tube 10.

The closure member 13 is constituted by a thin flexible metal sheet, preferably 0.2 to 0.6 mm thick, this sheet 56 being of stainless steel which does not retain the memory of the deformations it may undergo. In other words, the material employed does not have a remanent deformation and it always returns to its initial state after a deformation.

The stainless steel sheet 56 is rolled onto itself and inserted in the plunger tube, the fastening thereof in the suitable position being achieved by rivets 57 disposed alongside an edge 58 of the sheet and riveted to the wall part 12 opposite the aperture 11.

An annular shoulder 59 protects the upper edge of the sheet 56 and affords continuity of the passage for the liquid, consequently limiting as far as possible leakage between the sheet 56 and the plunger tube 10.

In another embodiment shown in FIG. 6, the closure member 13 is constituted by a plate 50 and two resilient rings 51. The resilient rings 51 are fixed to the wall part 12*a* opposite the aperture 11 by means of rivets 52 and are inserted by their free end portions 53 in clips 54 provided on the plate 50.

The overfill device of the present invention operates in the following manner.

The support 5 is first of all assembled with the body 6 of the overfill device and then the float 8 is swung over toward the plunger tube 10 so as to bring it to a position inside the plunger tube 10. This is made possible by the fact that the concave part 55 of the inner side 60 of the float 8 comes to bear against the rolled sheet 56 which is deformed by rolling onto itself owing to its resilience and thereby clears sufficient space for the passage of the float through the aperture 11 and the positioning of the float within the plunger tube 10. The positioning of the float 8 in the plunger tube 10 corresponds to a position of the valve 7 which is beyond its opening position. In this case, the abutment 34 bears against the inner surface of the body 6 and urges, in opposition to the action of the spring 32, the damping valve 28 away from the downstream side 18.

The overfill device, with the float 8 within the plunger tube 10, is introduced in the passage tube 3 of the storage tank. When the overfill device is inside the storage tank 1 and as soon as the float 8 is no longer in contact with the inner surface of the passage tube 3, it takes up a normal at-rest position outside the plunger tube 10 and thereby releases the metal sheet 56 which unrolls and comes to close the aperture 11 so that the liquid can flow with a negligible pressure drop through the plunger tube 10. The float is brought to the position of rest owing to the combined action of the spring 32 which closes the damping valve 28 and the abutment 34 which defines the opening position of the valve 7.

The liquid which is admitted into the overfill device and comes from a source (not shown), flows on and around the curved wall portion 19 which prevents it from exerting a pressure on the upstream side of the valve 7 and therefore prevents the latter from closing in an untimely manner.

The float 8 which follows the rise of liquid in the storage tank 1 starts to shift the valve 7 toward the closing position when the liquid level reaches a predetermined threshold.

Owing to the eccentricity of the pivot pin 14 of the valve 7 with respect to the vertical axis X—X of the body 6, an imbalance torque is created which tends to rapidly close the valve 7 onto the seat 36. The sudden closing of the valve 7 results in a rise in pressure in the upstream chamber and the creation of a shock-wave. In a first stage, the rise in pressure in the upstream chamber 15 causes the closure of the valve 22. In a second stage, when the shock-wave has reached an excessive value, it causes the opening of the damping valve 28 and thus puts the upstream and downstream chambers 15 and 16 in communication with each other. This limits the possibility of the valve 7 opening again and causing hammering.

When the liquid level reaches the predetermined threshold, the filling of the storage tank 1 is stopped. The pressure in the upstream chamber 15 is stabilized and depends on the pressure head between the supply source and the valve 7.

A very slight leakage remains and is due to manufacturing tolerances. As soon as the person in charge of the filling closes the control gate valve of the supply source, a decompression in the upstream chamber 15 occurs owing to this slight leakage and, when the decompression reaches the value predetermined by the stiffness of the spring 26, the valve 22 opens and in this way hastens the drop in pressure in the upstream chamber until an almost zero value is reached. The valve 7 is then opened by the counterweight effect of the float 8 which is out of the liquid so as to permit the complete emptying of the upstream chamber 15 and the hose connecting the overfill device to the source.

Any false action on the part of the person in charge of the filling which would tend to continue the filling will be immediately countered by the closure of the valve 7 onto its seat 36.

What is claimed is:

1. Overfill device for insertion in a liquid storage tank through a passage orifice provided in a wall of said storage tank, said overfill device comprising a body having a vertical axis, a plunger tube extending said body and defined by a wall having an inner surface, a flap valve mounted in said body and movable between an opening position and a closing position, a valve seat in said body with which seat said flap valve is cooperative and against which seat said valve comes to bear in said closing position, an aperture in said wall of said plunger tube, a float connected to said flap valve and capable of being at least partly inserted in said plunger tube through said aperture, said float being adapted and arranged in combination with said flap valve to bring said flap valve from said opening position to said closing position at a predetermined level of the liquid in said storage tank, and operative flexible closing means for closing said aperture, said means being mounted in said plunger tube to be and being adapted and arranged to be applied against parts of said inner surface of said plunger tube on both sides of said aperture and thereby closing said aperture when said float is located outside said plunger tube.

2. Overfill device according to claim 1, wherein said aperture closing means comprises a resilient sheet rolled onto itself and having no remanent deformation.

3. Overfill device according to claim 2, wherein said resilient sheet is a metal sheet.

4. Overfill device according to claim 3, wherein said metal sheet is of stainless steel.

5. Overfill device according to claim 4, wherein said stainless steel sheet is 0.2 to 0.6 mm thick.

6. Overfill device according to claim 2, wherein said resilient sheet has vertical edges and is fixed alongside one of said vertical edges to a part of said wall of said plunger tube opposite said aperture.

7. Overfill device according to claim 1, wherein said flap valve is a butterfly valve having a pivot pin which is offset relative to said vertical axis.

8. Overfill device according to claim 1, wherein said valve seat is inclined at substantially 45° to said vertical axis.

9. Overfill device according to claim 1, wherein said float is elongated and has a cross-section which is substantially in the shape of a circular sector, said float has an inner side which is in major part planar with at least one concave part, and a substantially "chair"-shaped lever connects said float to said flap valve and has a lower portion and an inclined intermediate portion which makes an angle equal to at least 90° with said lower portion, said lower portion being also inclined and in alignment with an upper generatrix of said float.

10. Overfill device according to claim 1, wherein said plunger tube comprises on said inner surface thereof an annular shoulder located above an upper edge of said closure member.

11. Overfill device according to claim 1, wherein said closure member comprises a plate and at least two resilient rings which are in contact with said plate and are in bearing relation to apart of said inner surface of said wall of said plunger tube which is opposite said aperture.

12. Overfill device according to claim 11, wherein said plate has upper and lower ends and said resilient rings are located in the vicinity of said upper and lower ends.

13. Overfill device according to claim 1 wherein said aperture closing means comprises a plate supported by resilient rings fixed to the interior wall of said plunger tube opposite said aperture.

14. Overfill device according to claim 1 wherein said aperture closing means comprises an elastically deformable closure member which, owing to the resilience of said closure member, bears against parts of said inner surface of said plunger tube on both sides of said aperture thereby closing said aperture when said float is located outside said plunger tube.

* * * * *

UNITED STATES PATENT AND TRADEMARK OFFICE
CERTIFICATE OF CORRECTION

PATENT NO. : 5,152,315
DATED : October 6, 1992
INVENTOR(S) : Roland Lagache

It is certified that error appears in the above-identified patent and that said Letters Patent is hereby corrected as shown below:

Col. 3, line 1, after "orifice" insert --2--.

Col. 6, line 24, "to be" (first occurrence) should read --tube--.

Signed and Sealed this

Twenty-second Day of February, 1994

Attest:

BRUCE LEHMAN

Attesting Officer     Commissioner of Patents and Trademarks